US006837428B2

(12) United States Patent
Lee et al.

(10) Patent No.: US 6,837,428 B2
(45) Date of Patent: Jan. 4, 2005

(54) SELF-CHECKOUT APPARATUS

(76) Inventors: Mike Lee, c/o Productivity Solutions Inc, 10550 Deerwood Park Blvd., Suite 509, Jacksonville, FL (US) 32256; Chuck Kurtz, c/o Productivity Solutions Inc, 10550 Deerwood Park Blvd., Suite 509, Jacksonville, FL (US) 32256; Ron Wallace, c/o Productivity Solutions Inc, 10550 Deerwood Park Blvd., Suite 509, Jacksonville, FL (US) 32256; Scott Dickover, c/o Productivity Solutions Inc, 10550 Deerwood Park Blvd., Suite 509, Jacksonville, FL (US) 32256; Mike Radzimski, c/o Productivity Solutions Inc, 10550 Deerwood Park Blvd., Suite 509, Jacksonville, FL (US) 32256; Wes Dickover, c/o Productivity Solutions Inc, 10550 Deerwood Park Blvd., Suite 509, Jacksonville, FL (US) 32256; Scott Martin, c/o Productivity Solutions Inc, 10550 Deerwood Park Blvd., Suite 509, Jacksonville, FL (US) 32256; Terry Nesbit, c/o Productivity Solutions Inc, 10550 Deerwood Park Blvd., Suite 509, Jacksonville, FL (US) 32256; Derek Williams, c/o Productivity Solutions Inc, 10550 Deerwood Park Blvd., Suite 509, Jacksonville, FL (US) 32256; John Allard, c/o Productivity Solutions Inc, 10550 Deerwood Park Blvd., Suite 509, Jacksonville, FL (US) 32256

( * ) Notice: Subject to any disclaimer, the term of this patent is extended or adjusted under 35 U.S.C. 154(b) by 138 days.

(21) Appl. No.: 09/943,432

(22) Filed: Aug. 7, 2001

(65) Prior Publication Data

US 2003/0001007 A1 Jan. 2, 2003

Related U.S. Application Data

(60) Provisional application No. 60/273,097, filed on Mar. 5, 2001, and provisional application No. 60/301,714, filed on Jun. 28, 2001.

(51) Int. Cl.[7] .................................................. G06K 15/00

(52) U.S. Cl. ........................ 235/383; 235/385; 235/380

(58) Field of Search ................................ 235/380, 383, 235/385, 379, 384, 462.35, 472.01

(56) References Cited

U.S. PATENT DOCUMENTS

| | | | | | |
|---|---|---|---|---|---|
| 4,676,343 A | * | 6/1987 | Humble et al. | ............... | 186/61 |
| 4,766,296 A | | 8/1988 | Barth | ......................... | 235/383 |
| 4,940,116 A | | 7/1990 | O'Connor et al. | ............ | 186/61 |
| 4,964,053 A | | 10/1990 | Humble | ...................... | 364/466 |
| 5,311,969 A | | 5/1994 | Dickover et al. | ............. | 186/61 |
| 5,340,970 A | | 8/1994 | Wolfe, Jr. et al. | .......... | 235/383 |
| 5,424,521 A | | 6/1995 | Wolfe, Jr. et al. | .......... | 235/383 |
| 5,992,570 A | * | 11/1999 | Walter et al. | ................. | 186/36 |
| 6,497,362 B2 | * | 12/2002 | Persky et al. | ............... | 235/383 |

* cited by examiner

*Primary Examiner*—Thien M. Le
(74) *Attorney, Agent, or Firm*—Mintz, Levin, Cohn, Ferris, Glovsky and Popeo, P.C.

(57) ABSTRACT

A self-checkout system includes a first conveyor having a security tunnel which measures a characteristic of a product placed on the conveyor. A code identifying the product is first input into the system through UPC scanning or other input means, and then placed on the conveyor. When the characteristic of the product is measured (e.g., weight, height, width, length), it is compared to corresponding information within the system. If the data matches or is within a predetermined tolerance, the product is transported down the conveyor to a second conveyor, which further transports the product to a bagging area. When the customer is finished scanning products, an input device allows the customer to select self-payment through either cash, credit, debit, or other means (e.g., ebt, store credit and the like). Other features include automatic security tag deactivation and coupon redemption.

39 Claims, 20 Drawing Sheets

SELF-CHECKOUT APPARATUS

This application claims benefit of U.S. Provisional Application No. 60/273,097, filed Mar. 5, 2001, and U.S. Provisional Application No. 60/301,714, filed Jun. 28, 2001; each disclosure of which is herein incorporated by reference.

BACKGROUND OF THE INVENTION

1. Field of the Invention

The present invention relates to a self-service checkout system, and more particularly to a self-service checkout system having self-payment and other improved features.

2. Background of the Related Art

Self-service has benefited consumers and retailers alike. Such systems have been widely adapted for purchasing gasoline at self-service service stations and are now becoming more available in retail stores.

Commonly-assigned U.S. Pat. No. 4,676,343 and U.S. Pat. No. 4,792,018, hereby incorporated by this reference thereto, disclose systems for the automated checkout of articles selected by a customer for purchase in supermarkets and like facilities. The former patent involves an arrangement addressing articles which bear a so-called "universal product code" (UPC), typically in the form of a bar code uniquely indicative of the identity of the article bearing the code. The UPC of each article selected for purchase is scanned or read and a signal indicative of the article identity is generated and applied to a central processing unit (CPU) which has stored in associated memory storage for the UPCs of all articles available for purchase which are so encoded, correlated with the price and other characteristics of the articles, such as weight.

Articles are placed on a conveyor following UPC scanning and thereby led into a "security tunnel", which is guarded against customer fraud by various light curtains, which are in the form of light sources and associated photocells. In the course of article conveyance, its weight is physically measured and a signal is generated indicative of the measurement.

Comparison is made of the stored, weight-indicative signal and the physical measured signal. If the comparison is negative, indicative of potential customer fraud, article processing is interrupted and various courses of action are obtainable, one being the reverse movement of the conveyor. Otherwise, in the course of continuing positive comparison results, the customer's order is carried forward, with price totalization effected from stored price-indicative signals.

In the latter patent, a number of further security measures are effected to detect customer fraud or checkout failure. In one such additional measure, article shape is detected, such as by the light curtain at the entry to the security tunnel. The CPU storage includes, with the article identity code, a cross-correlation of article shape. This compilation is desirably made from the system itself, as by storage of detected article shape in a system set up mode, through use of the light curtain output signals.

A second additional measure is the repeat reading of article UPC in the security tunnel and comparison of the same with that read by the scanner. Checkout failure would be present on negative comparison in this respect.

A third additional measure is the repeated weighing in the security tunnel of articles weighed on the scanner/scale.

A fourth additional measure is the introduction of electronic article surveillance (EAS) practice in the security tunnel. Here, storage is made with UPC of whether or not the article so encoded should have an EAS tag thereon. If the article is detected as having an EAS tag thereon and storage indicates that it should not, such as would be the case where a customer tries fraudulently to substitute an expensive wine purchase for a cheaper wine subjected to UPC scanning, checkout failure would again occur.

In both systems, when a shopper completes the transaction, a receipt is printed at the scanning location, which the shopper must bring, along with his purchased goods, to a checkout clerk who then completes the transaction by processing payment. This results in the retail establishment requiring personnel to be stationed at a payment station, which, depending upon the number of self-checkout station the store contains, may create a backup of people who want to pay for the their purchase, but must wait for others.

Accordingly, it would be advantageous to provide a self-payment mechanism whereby a patron may tender payment in any form directly at the self-checkout lane.

Still yet another problem facing self-checkout systems is the collection of coupons. In prior art conveyor type self-checkout systems, like that disclosed in U.S. Pat. No. 4,676,343, coupons were redeemed at a payment counter, where a store clerk collected the coupon, applied the credit to the total purchase price if the coupon matched a product purchased and still valid. Thus, there exists a need to redeem, validate and collect coupons at the self-checkout lanes.

Still another problem with existing self-checkout lanes is the proper deactivation of security tags when an item is purchased. A security tag is placed on certain items (e.g., clothing) to prevent their theft from the store premises and must be deactivated before passing security arches located at exits of a store, otherwise, a security alarm will be triggered.

At conventional checkout lanes, a cashier passes the security tags over a single deactivator pad after scanning them. However, in a self-checkout system, it would be advantageous to have an automatic device which would insure automatic and complete deactivation of such tags without requiring the customer to do so. Moreover, it would be advantageous to be able to determine, at the point of purchase, if a security tag has been properly deactivated.

The above stated problems all result in slower purchasing and throughput times, lowering the sales volume for store owners and requiring shoppers to spend more time waiting in line.

SUMMARY OF THE INVENTION

Accordingly, the present invention addresses all of the above concerns and provides an improved self-checkout system having self-payment features, coupon redemption capabilities and security tag deactivation.

In one aspect of the present invention, a system for self-purchasing a product by a shopper includes conveyor means for receipt and transport of such product, means providing a security zone extending along at least a portion of said conveyor means, and sensing means at an inlet to said security zone. The sensing means comprises a first article characteristic sensing means and a second article presence sensing means. The first sensing means being positioned upstream of the second article sensing means with respect to the conveyor means, the sensing means generating output signals, each indicative of an entry through said inlet into the security zone. The system also includes control means for selective movement of the conveyor means in article acceptance and article rejection senses. The control means being operable for continuance of movement of the conveyor means in article acceptance sense upon occurrence of a first sensing means output signal and for moving the conveyor means in article rejection sense in response to occurrence of another of the first sensing means output signals. The system further includes a transaction terminal having payment accepting means for enabling the shopper to effect payment for purchased items, cash dispensing means for providing the shopper with cash by way of change, and a display screen arranged to guide the customer through a purchasing transaction and to provide to the customer an indication of the total amount to be paid by the customer for purchased items.

The above aspect may also include ATM functionality such as cash back.

In another aspect of the present invention, a security tag deactivation apparatus for a self-checkout system includes product code input means for inputting identification information of a product, a first conveyor for transporting a product whose code has been input into the system, and a security tunnel positioned adjacent a first end of the conveyor. The tunnel includes characteristic measuring means for measuring a characteristic of the product. The apparatus includes a first zone for detecting and/or deactivating a magnetic security tag. The first zone extending from the an upper portion of said security tunnel down to the conveyor and a second zone for detecting and/or deactivating a magnetic security tag. The second zone positioned adjacent a second end of the conveyor and extending out from the conveyor in an upward direction.

In yet another aspect of the present invention, a method for deactivating a security tag included on an item for purchase includes placing an item having a security tag attached thereto on a conveyor for transporting the item a predetermined distance, the conveyor transporting the item through a security tunnel, providing a first zone for deactivating and/or sensing the tag, where the first zone down from an upper portion of said security tunnel to the conveyor, and providing a second zone extending up from the conveyor and spaced away from the first zone.

In yet another aspect of the present invention, a method for deactivating a security tag included on an item includes placing an article having an active security tag attached thereto onto a conveyor, providing a first deactivation zone established by a first deactivator extending up from the conveyor to a first distance, and providing a second deactivation zone by a second deactivator extending down from a second distance to a third distance above said surface. The second distance is positioned above said first distance, the third distance is positioned between the surface and the first distance. The method also includes the steps of varying a strength of at least one of the first and said second deactivation zones, providing a security tag detection zone established by a variable strength security tag detector where the detection zone is provided adjacent one of the deactivation areas in a conveyor transporting direction, and varying a strength of the security tag detection zone.

In yet another aspect of the present invention, a method for deactivating a security tag attached to an item in a self-checkout system includes identifying an item having a security tag attached thereto for purchase, placing the item on a checkout surface within a deactivation area, providing a first deactivation zone extending down from a first distance above the checkout surface, and providing a second deactivation zone extending up a second distance above the checkout surface, where the second distance is positioned above the first distance.

In yet another aspect of the present invention, a self-checkout system for performing a purchasing transaction includes display means for displaying details associated with a purchasing transaction, input means for inputting a first identification of an article and for inputting a second identification of a coupon, receiving means for receiving the coupon after the second identification is input, where the receiving means has a sensor for detecting when the coupon has been received. The system also includes memory means for storage of a database where the database includes first identification data, second identification data, pricing data associated with the first identification data, credit data associated with the second identification data, and association data, and controller means for controlling operation of the system.

In yet another aspect of the present invention, a self-checkout system for performing a purchasing transaction includes a display for displaying details associated with a purchasing transaction, a UPC scanner for inputting a first UPC code for an article and for inputting a second UPC code of a coupon, a coupon compartment for receiving the coupon after the second identification is input, where the compartment has a sensor for detecting when the coupon has been received, a memory for storage of a database having first UPC code data, second UPC code data, pricing data associated with said first identification data, credit data associated with said second UPC code data, and association data comprising information for associating the coupon with the purchasing transaction, and a controller for controlling operation of the system.

In yet another aspect of the present invention, a method of conducting a purchasing transaction with a customer in a self-checkout apparatus includes inputting a first identification of an article for purchase, displaying a price associated with the first identification on a display, inputting a second identification for a coupon for credit, validating the coupon, where when the coupon is positively validated, a credit associated with the coupon is applied against a total of the purchasing transaction, and where when the coupon is negatively validated, an error message is displayed indicating that the coupon cannot be used. The method further includes receiving the coupon in a coupon receiving area comprising a compartment having an opening with an adjacent sensor for receiving and storing the coupon after the coupon has been positively validated. When the coupon is not received in the coupon receiving area within a predetermined period of time the credit is withdrawn against the purchasing transaction.

The above aspects will become even more clear with reference to the following drawings and detailed description.

DETAILED DESCRIPTION OF THE PREFERRED EMBODIMENTS

Figure 1:
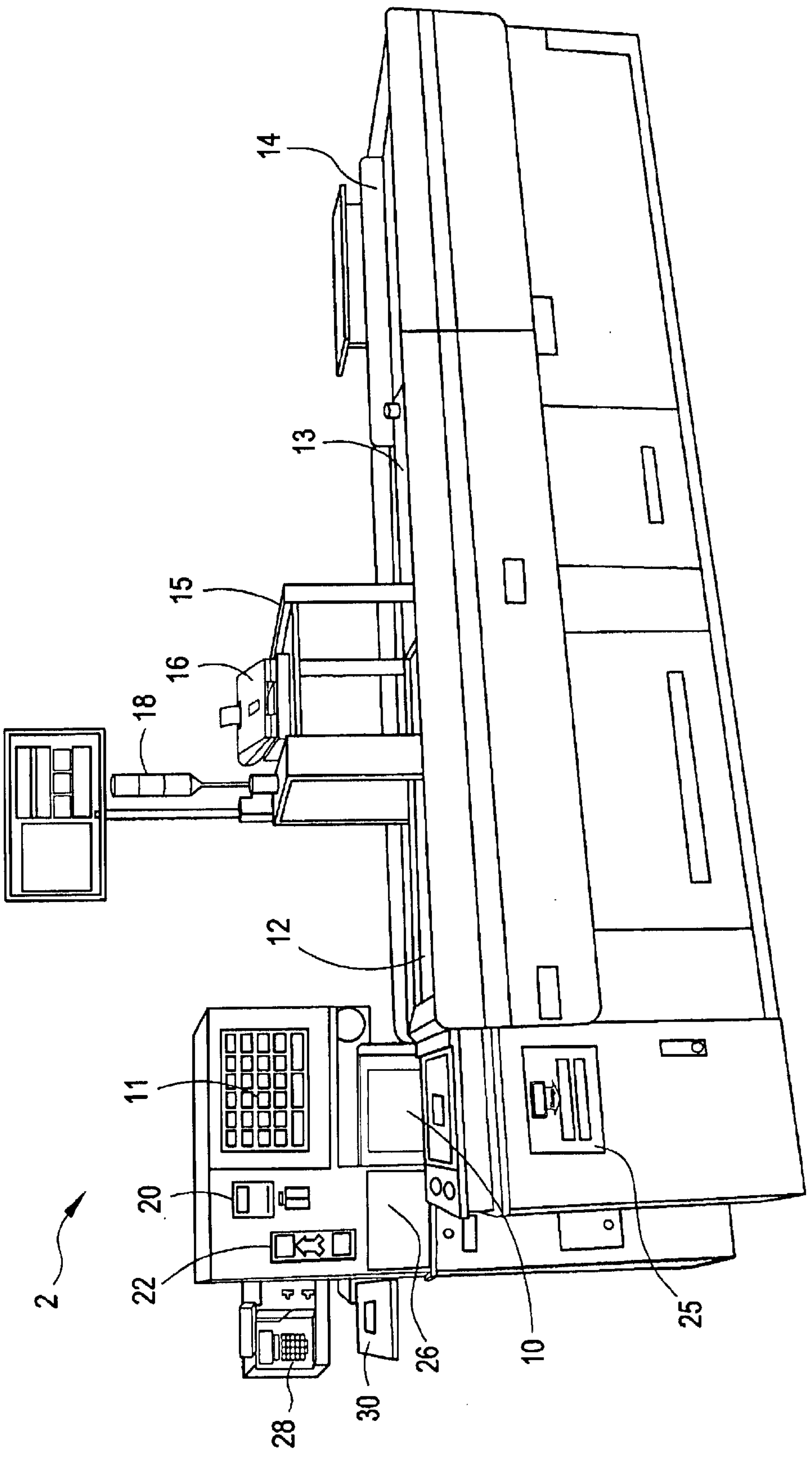
FIG. 1 illustrates a self-checkout system according to the present invention.
Figure 2:
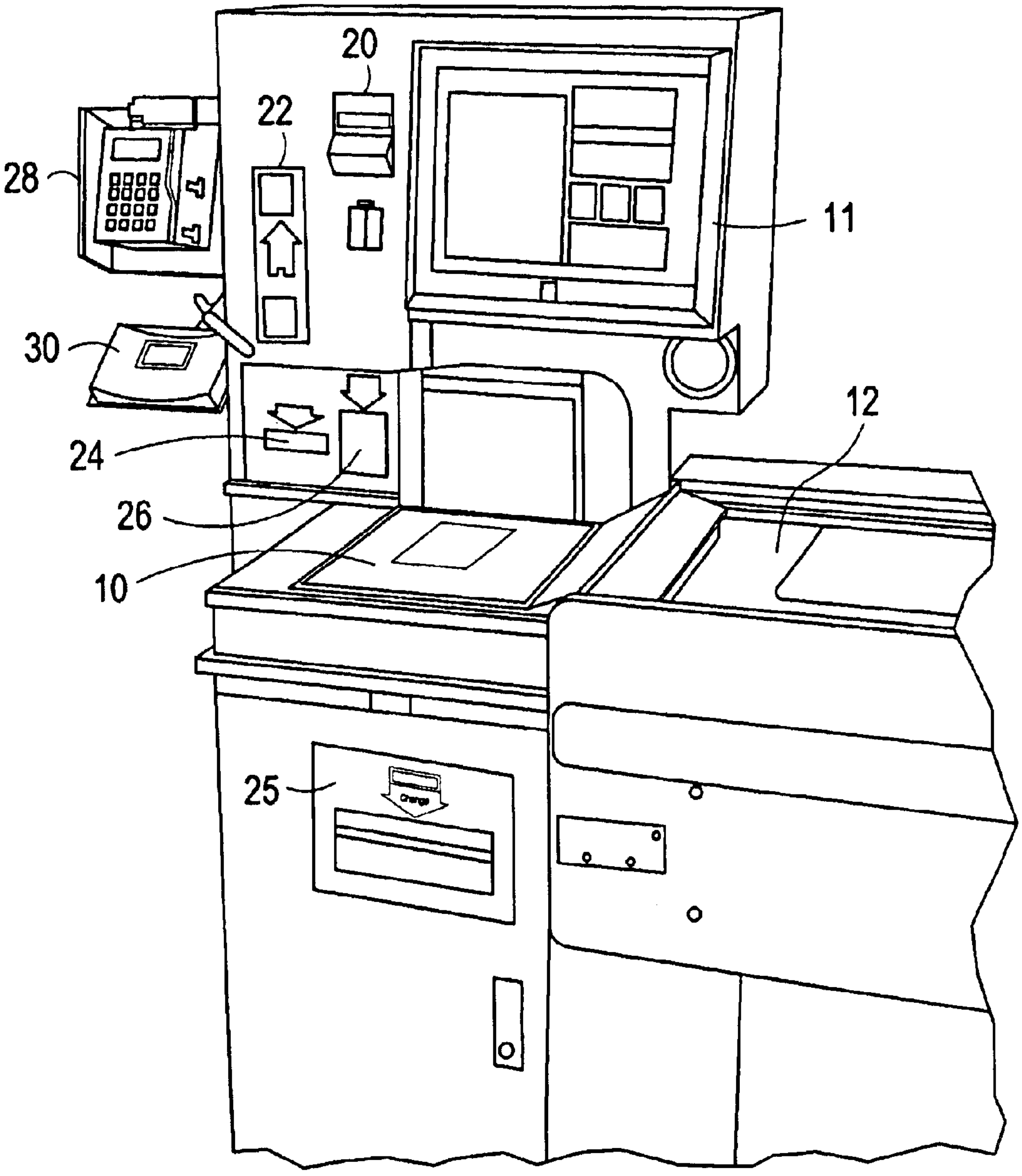
FIG. 2 illustrates an enlarged view of a self-payment and coupon collection features according to the present invention.
Figure 3:
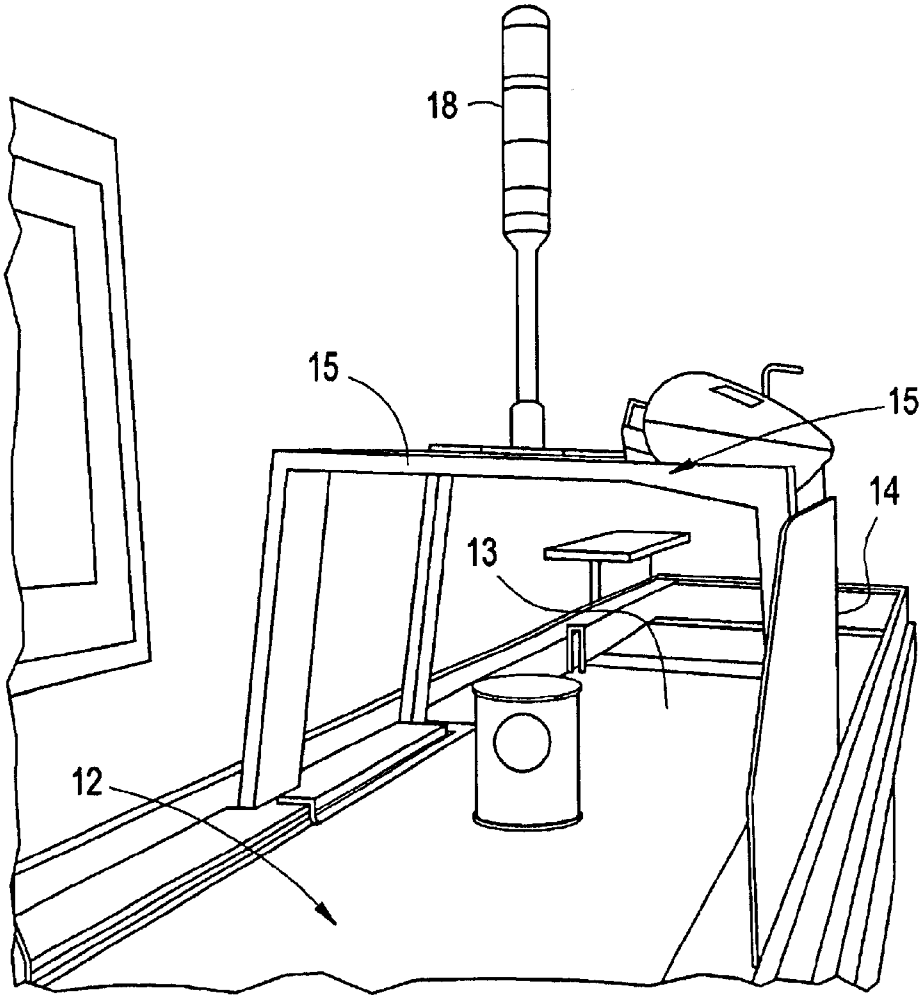
FIG. 3 illustrates a security device used the self-checkout apparatus according to the present invention.

FIGS. 1–3 illustrate a automatic checkout system 2 according to the present invention. The system includes a laser universal product code (UPC) reader 10, a display screen 11 for interactive customer communication and guidance, an entry conveyor 12, an outfeed conveyor 13, a bagging area 14, a security tunnel 15, a receipt unit 16, and a payment indicator light 18.

The present invention is most aptly used with a system which uses a security system (as shown in FIG. 3) utilizing the known weight of each item to protect against consumer fraud. Specifically, most products in a supermarket are provided with identification in the form of the universal product code (UPC) which identifies the product as well as one of its parameters such as size, volume or weight. Size and volume can each be converted by known means into corresponding weight. Thus, reading the UPC label on the product can furnish information as to weight of any product.

Such a system is disclosed in U.S. Pat. No. 4,676,343 (the '343 patent), with the present invention including additional features of self-payment options using credit, debit, EBT, and coupons self tendered at the lane, although payment through a cashier may also be made.

According to the present invention, a plurality of such systems each include a controller which are linked to a local area network. The system also includes a BOSS controller, and a Point-Of-Sale Controller. The BOSS controller controls database information for the lanes, i.e., all the information relating to products: UPC code identifier, price, weight, and the like. Each lane includes a copy of the database, so that the lanes can operate independently of the BOSS. In that regard, database information may be updated at any lane and at the BOSS controller. At predetermined intervals, the database between the BOSS controller and the lanes is updated. Thus, when the database has changed at any lane and/or at the BOSS controller, the changes are ultimately passed to the other lanes.

The BOSS controller may also be configured to enable supervisory personnel to generate reports on sales and lane performance. Credit/debit transactions and coupon reports may be generated at each lane. Moreover, a lane may be designated as a BOSS controller if necessary. One skilled in the art will also appreciate that the BOSS controller is not a necessary part of the system according to the present invention.

The point of sale controller manages a database for type 2, or, sold-by-weight products (i.e., meats, salads, and the like). The BOSS controller receives a file from the Point-Of-Sale controller at a predetermined interval, which contains the information related to the type 2 products. The Point-Of-Sale controller is connected to each lane independently and the connection is not impacted by the presence (or lack of) the BOSS controller.

Self-Payment

The payment and cash tendering features of the present invention are as follows. A bill acceptor 20 accepts bill denominations between $1 to $100. The bill acceptor may be a Mars LE390, for example, which is a non-contact optical reading, four (4) way bill reader that accepts a plurality of bills up to a predetermined amount regardless of the bill's orientation when inserted. Jamming of bills are minimal due to a simple bill path.

A coin acceptor 22 also accepts all coins from pennies to dollar coins. The accepted coins are routed to a coin collection container for later removal when full. In addition, in one embodiment of the invention, the coins stored in the coin collection container may be used as change dispensed to a customer at the close of a transaction.

The system also includes a cash dispensing device 25, which dispenses bill denominations between $1 and $20 or more (if necessary). An example of such a cash dispensing device may be found a Diebold MMD, for example, which may dispense approximately 2000–2500 bills from a bill cassette tray. One or more bill cassettes may be used to dispense such an amount of bills.

Similarly, the system is also capable of dispensing coins from a coin dispenser 26 from pennies to dollars, and the system may be designed to hold at least a predetermined minimum amount of coins or use coins from the coin collection container of the coin acceptor.

Figure 4A:
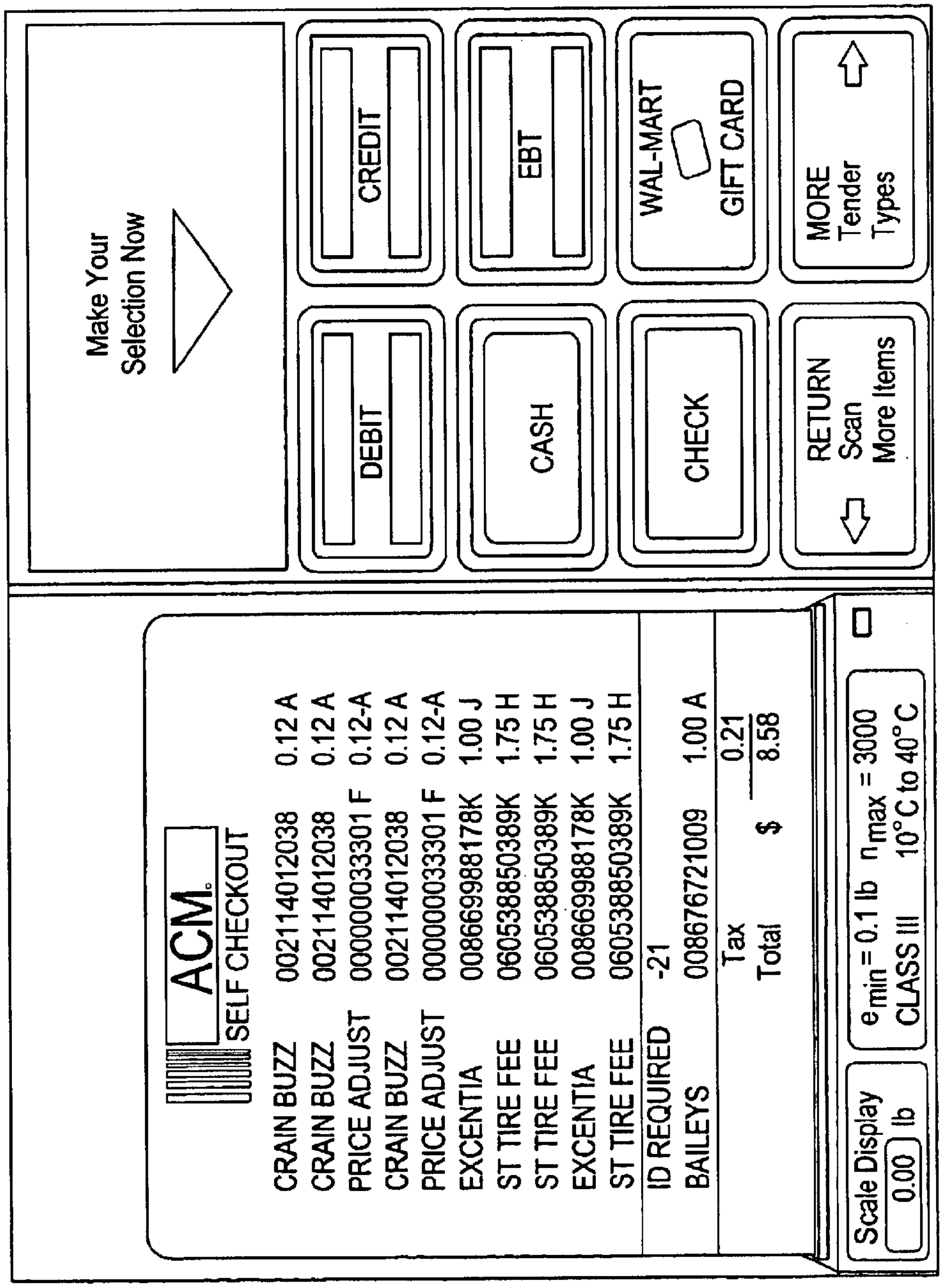
FIGS. 4A–4C illustrate credit and debit payment features for the self-service checkout apparatus according to the present invention.
Figure 4B:
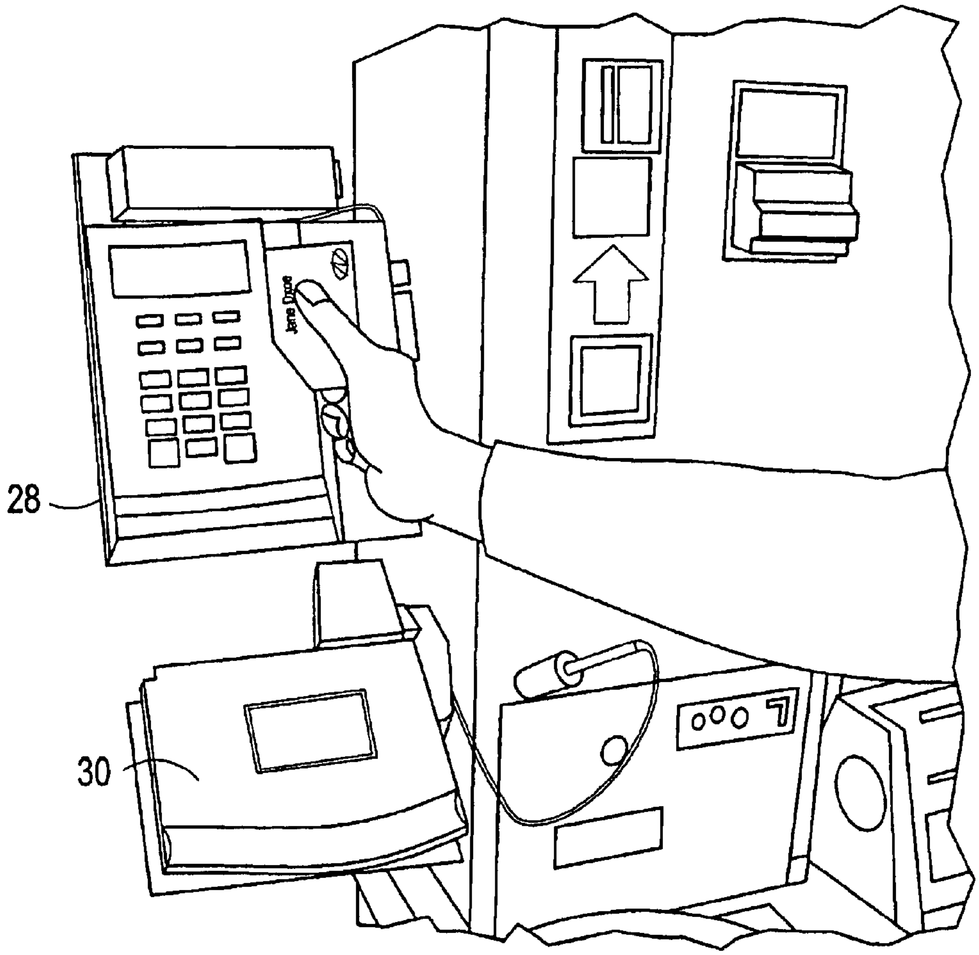
Figure 4C:
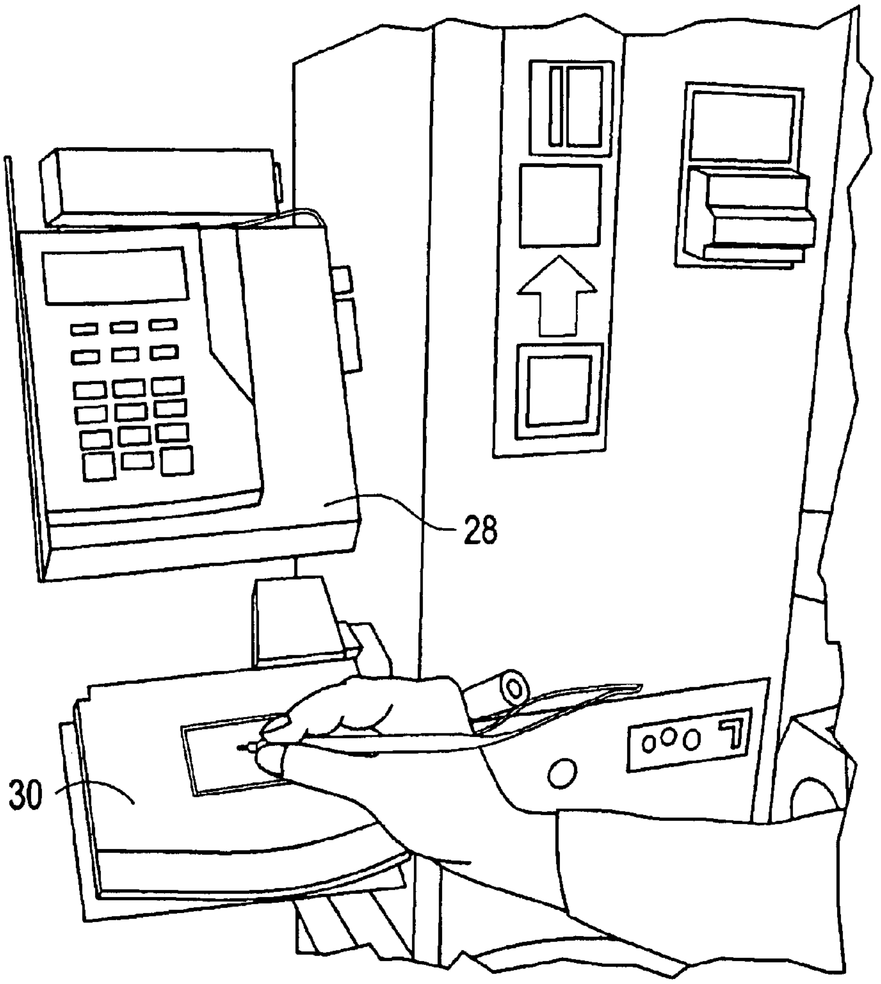

Additional payment/tending features include electronic payment processing as shown in FIGS. 4A–4C. The features associated with electronic payment guides customers through the necessary steps to scan and pay for their order. Accordingly, the present invention includes a MSR/PIN pad 28 which allows a customer to quickly enter credit/debit/EBT information either by keying in the appropriate account number, or by swiping the card's magnetic strip in the appropriate magnetic strip reading area on the device.

An electronic signature capture device 30 may also be used, which allows customers to include an electronic signature when paying for products with a credit card.

Figure 5:
FIG. 5 illustrates a customer initiating a purchasing transaction with the self-checkout system according to the present invention.
Figure 6:
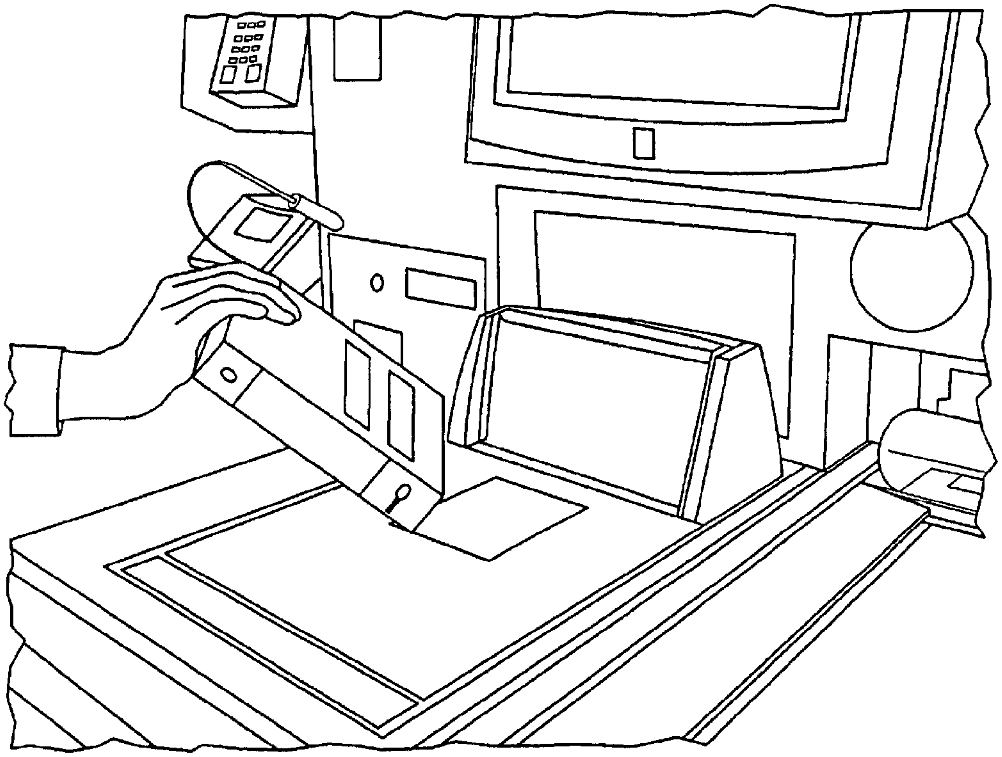
FIG. 6 illustrates the customer scanning an item for purchase with the UPC scanner included with the self-checkout system according to the present invention.

The process for self-payment of products purchased at a self-checkout system according to the present invention initially starts with the a customer approaching the self-checkout lane (FIG. 5). The customer is instructed through verbal and/or visual prompts to began scanning items for purchase using the UPC scanner (FIG. 6). Thereafter, the customer places the scanned in items on the first (security) conveyor 12, which subsequently weighs/measures the item and compares it to the corresponding data in a security database. If the item weight/measurement match (within a predetermined tolerance) the corresponding data in the security database, then the item proceeds down the first conveyor to the second (transport) conveyor, which transports the item to the bagging area 14.

Figure 7:
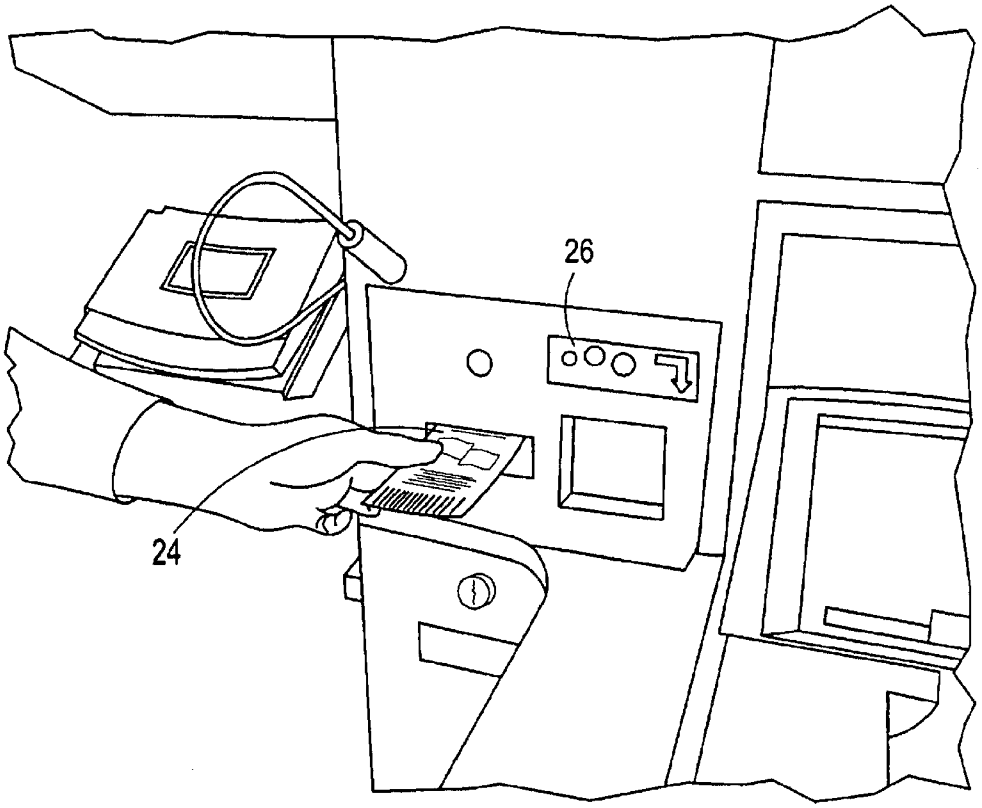
FIG. 7 illustrates a coupon collection device for use with the self-checkout system according to the present invention.

As shown in FIG. 7, coupons may be scanned using the UPC scanner at any time during the transaction after the item corresponding to the coupon has been scanned, and prior to finalizing the order by pressing a payment option button. At the time the coupon is scanned, verbal and/or visual prompts give instructions to the customer to deposit the coupon in the coupon collection box. In one preferred embodiment, the transaction will not continue until the coupon is deposited in the coupon collection box.

Figure 8:
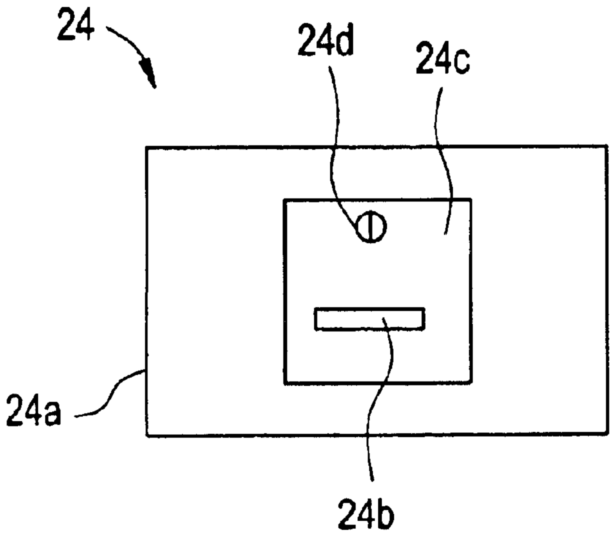
FIG. 8 illustrates a front view of the coupon collection device.
Figure 9:
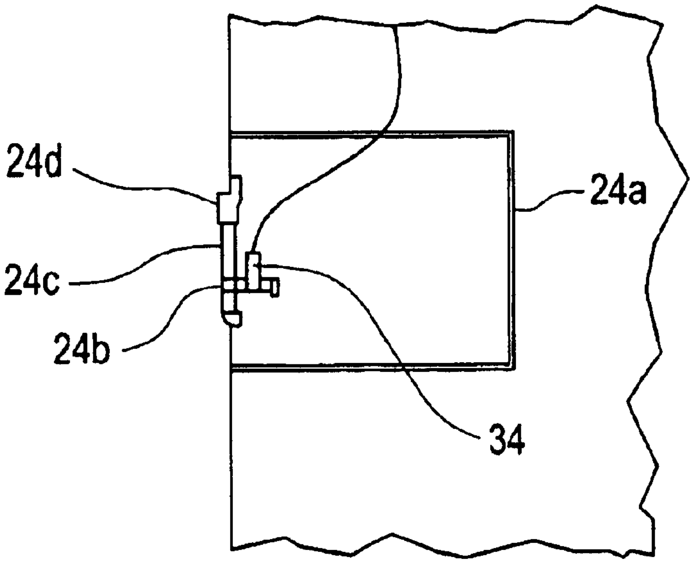
FIG. 9 illustrates a side view of the coupon collection device.

The coupon collection box 24, as shown in FIGS. 7–9, includes a substantially sealed compartment 24*a* having a slotted opening 24*b*. The slotted opening is positioned on a hinged door 24*c* having a lock 24*d*. Positioned adjacent the opening is a sensor 34 for detecting when a coupon has been inserted through the slot. The sensor may consist of a light sensor (e.g., LED with photosensitive diode). The door on the compartment allows supervisory personnel to remove coupons which have been inserted into the compartment.

Figure 10:
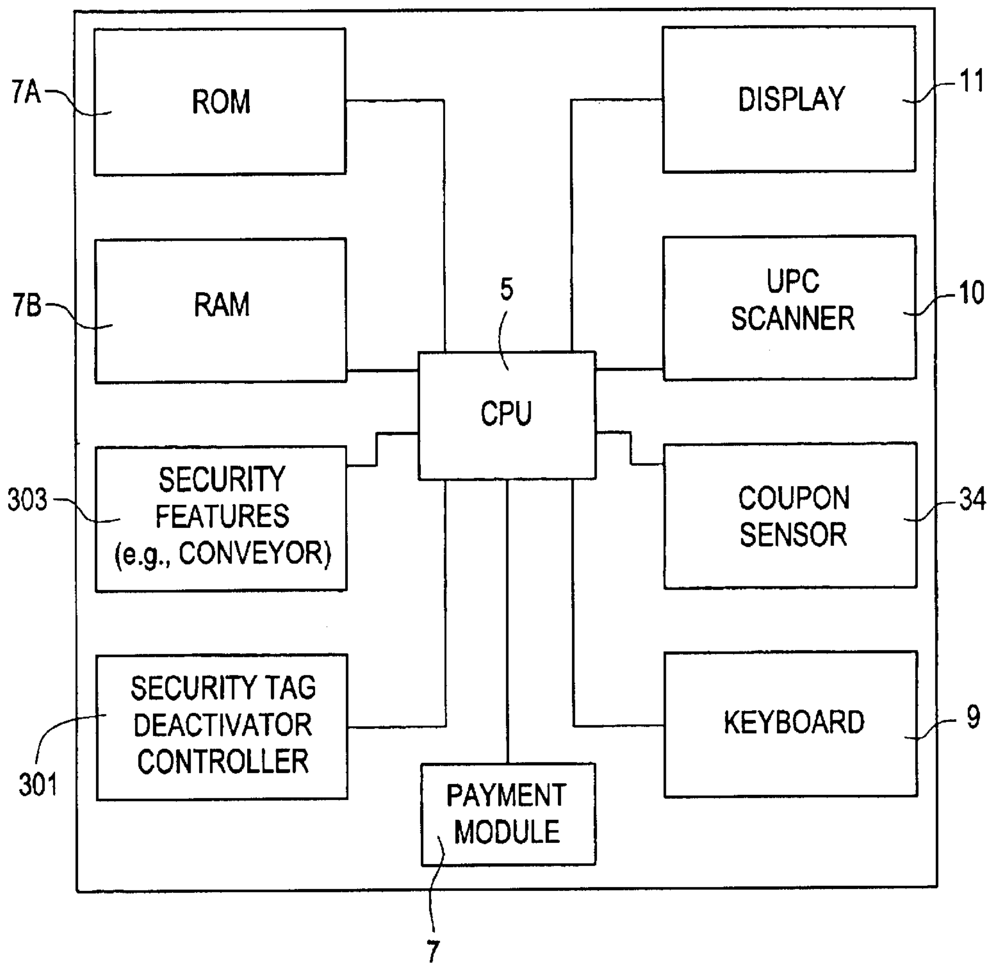
FIG. 10 illustrates a controller device for the self-checkout apparatus according to the present invention.

As shown in FIG. 10, the controller for the present invention includes a processor 5 in communication with a read-only memory (ROM) 11, for storing a control program, and a read-only memory (RAM) for storing other information during a transaction. The RAM may also be used as a temporary memory location the control program and other software. The processor is also in communication with a payment module 7 which includes the cash distribution and collection devices as well as the credit/debit/ebt modules. The display 8, the UPC scanner 10, coupon sensor 34, a keyboard 9 (or other input device), and security tag deactivator/detector controller 301 for controlling security tag deactivator/detectors, as well as the security features controller 300 in the present invention are also in communication with the processor.

Figure 11:
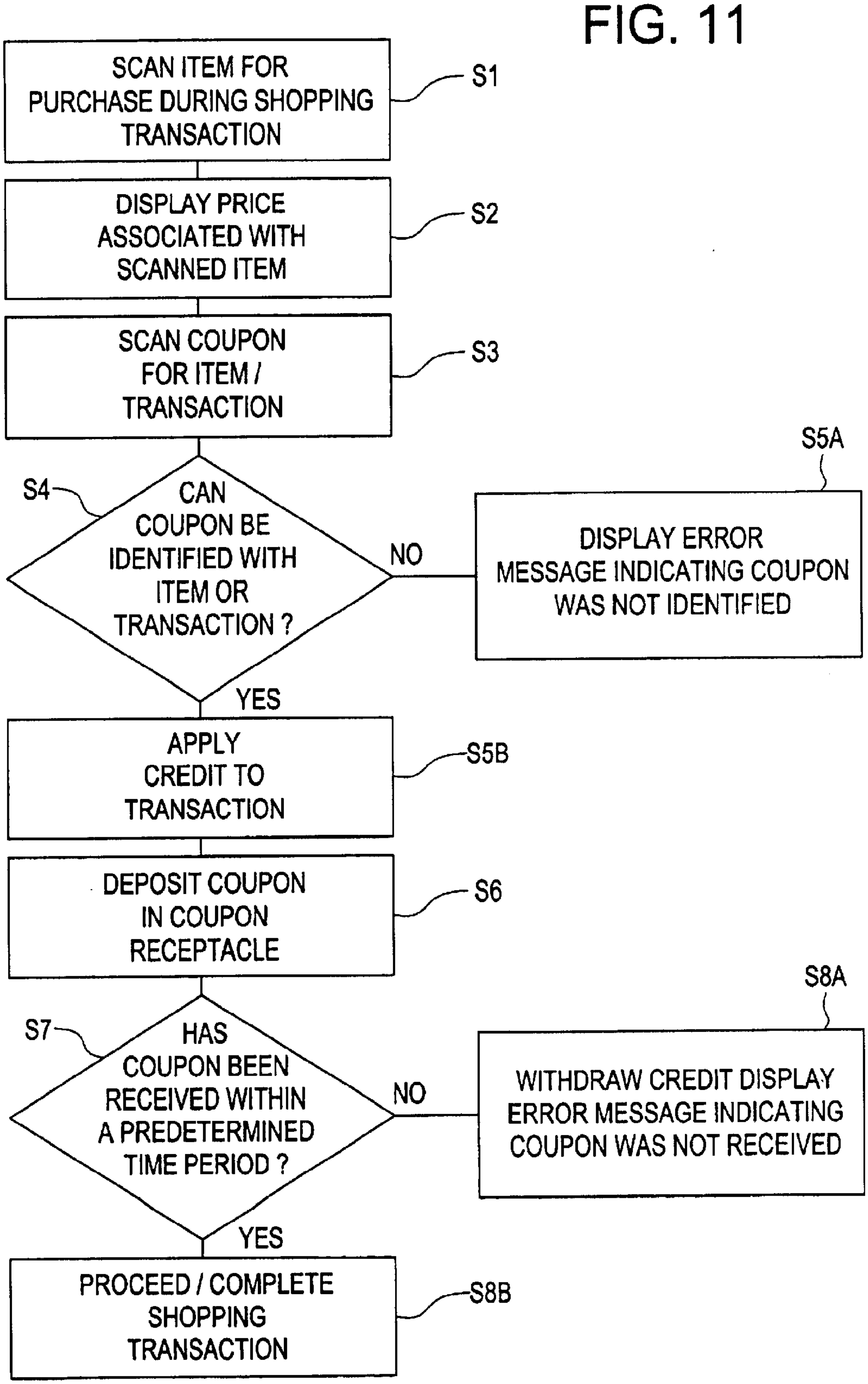
FIG. 11 illustrates a flowchart for the coupon system according to the present invention.

FIG. 11 is a flowchart illustrating a method of redeeming the coupons using the present invention. Accordingly, during a routine shopping transaction, a shopper scans in one or more items for purchase at a self-checkout system according to the present invention (step S1). After each item is scanned, the price for the item is displayed on the display (step S2).

After the shopper has completed scanning in an item(s), the shopper may then scan coupons relating to the items previously scanned (step S3). When a coupon is scanned, the vendor code from the coupon is matched against the vendor code(s) of the item(s) scanned in the order. If the coupon cannot be matched to the items previously scanned by the shopper or the transaction, an error message is displayed indicating that the coupon cannot be applied (validated) to the current transaction (step S5A). At this point, the shopper may try to rescan the UPC bar code on the coupon again.

If the coupon is identified in the merchant's UPC bar code database, and can be associated with one the item previously scanned by the shopper, then a credit is displayed and applied to the current total of the shopping transaction (step S5B). The shopper must then place the scanned coupon in the opening of the coupon compartment located adjacent the checkout area within a predetermined period of time (step S7). In a preferred embodiment of the invention, this period of time represents at the most one (1) minute, and more preferably between 5 and 15 seconds (step S6).

The sensor 34 positioned in the opening of the coupon compartment determines if and when the coupon has been inserted into the compartment. When the coupon has been properly inserted and received into the compartment, the sensor signals the controller indicating that the coupon has been received. This, of course, must be accomplished within the prescribed time period.

When the coupon has been received in the coupon compartment within the prescribed time period, the shopper may proceed to scan additional items for purchase, scan in additional coupons, or complete the transaction (step S8B).

If the coupon has not been received within the prescribed time period, the credit is withdrawn from the shopping transaction, and an error is displayed (step S8A). At that point, the coupon can be rescanned if necessary.

Figure 12:
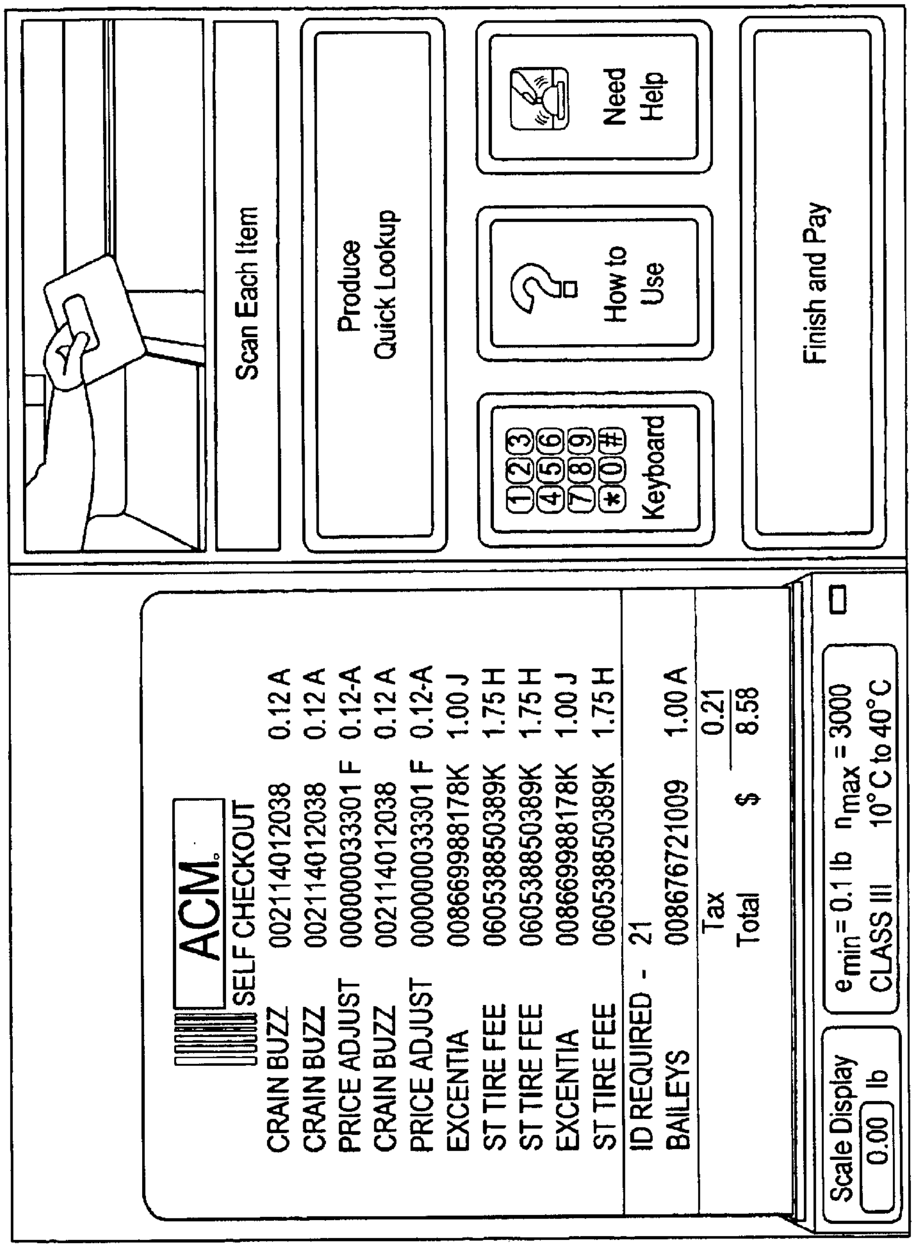
FIG. 12 illustrates a screen-shot of the display prior to a customer making payment for the purchased goods.
Figure 13:
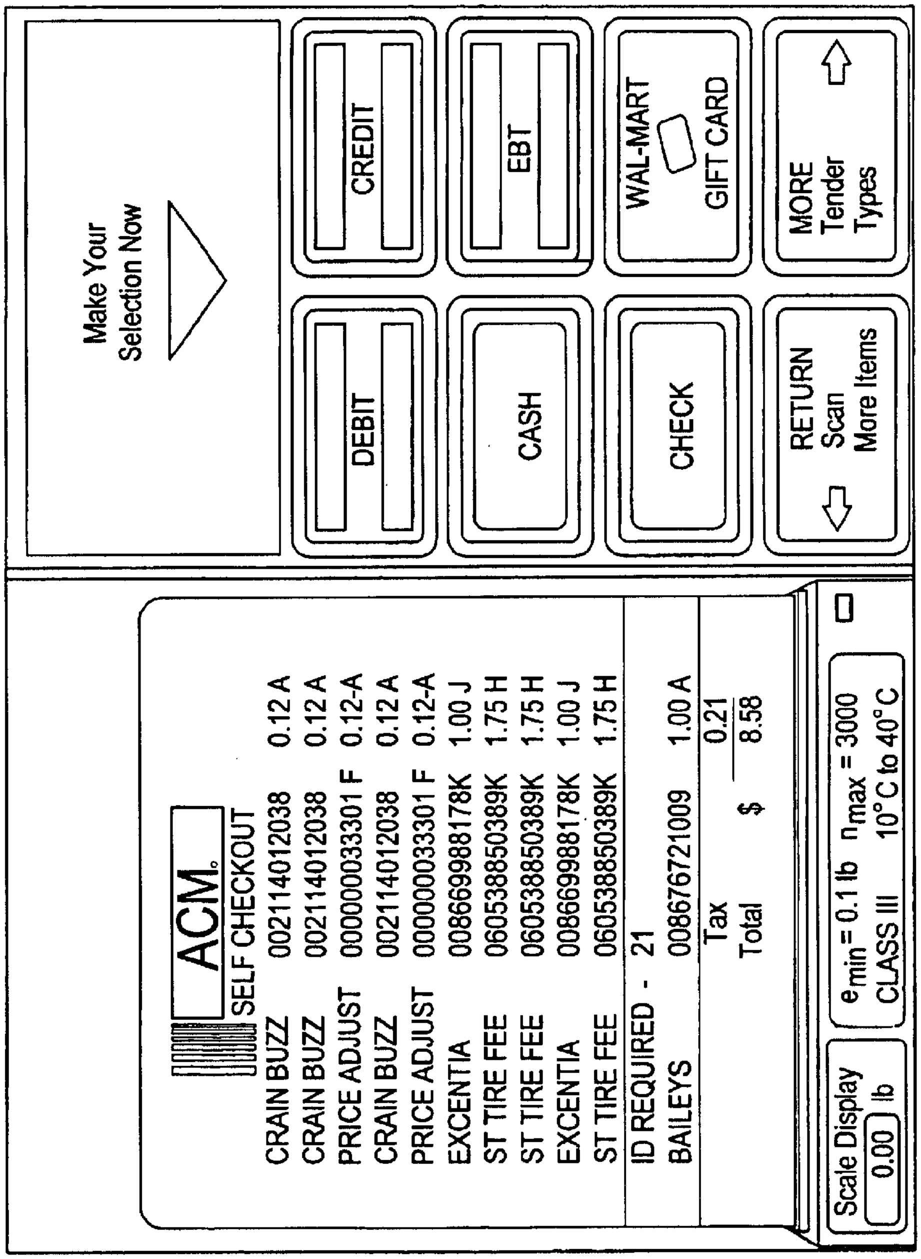
FIG. 13 illustrates a screen-shot of a payment screen, where cash payment is selected.

When the shopper has completed scanning, they will press the Finish and Pay icon 32 on display 11 (FIG. 12). The shopper is then presented with a payment selection screen (FIG. 13). At this time, the shopper touches a button for Credit, Debit, Cash, or Other Payments. The screen provides a minimum of six (6) payment type icons.

In the case where a customer selects payment by credit, debit, or EBT, the customer would scan his card through the MSR card reader, and select the appropriate buttons thereon for selection of credit/debit/EBT payment. If the customer selects debit, he is given a choice on whether he would like cash back. Prior to authorization of a debit card purchase, the customer must enter his PIN.

If the customer selects payment by credit card, then, the customer would sign for the purchase using the electronic signature pad 30.

Figure 14:
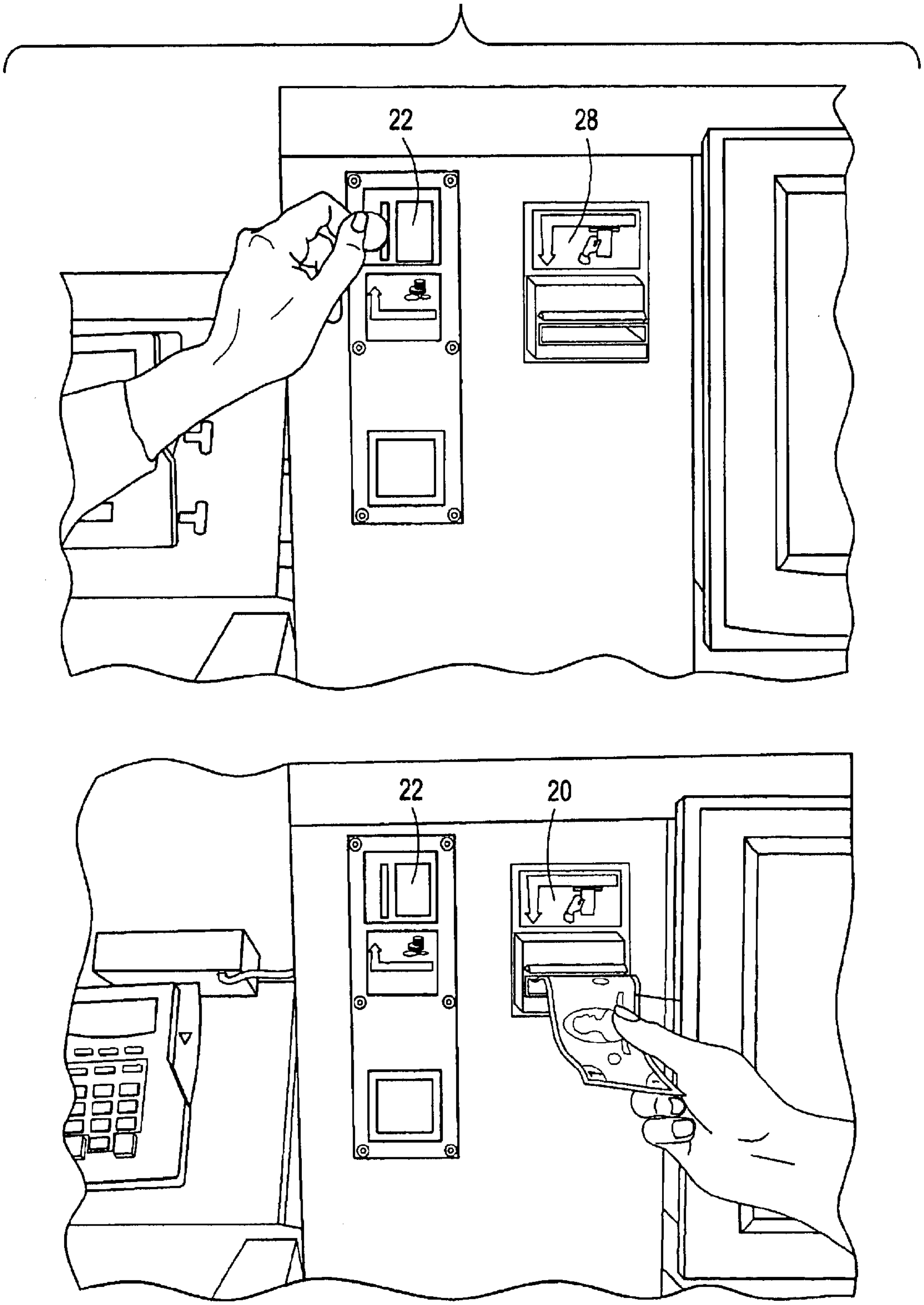
FIG. 14 illustrates a customer depositing coins and paper currency into the appropriate cash receiving areas of the self-payment device according to the present invention.

FIG. 13 illustrates a screen shot of the display, where the customer selects payment by cash. Accordingly, as shown in FIG. 14, the customer inserts coins in the coin acceptor 22 and/or paper currency in the paper currency acceptor 20 equal or greater than the total cost of the purchase.

Figure 15:
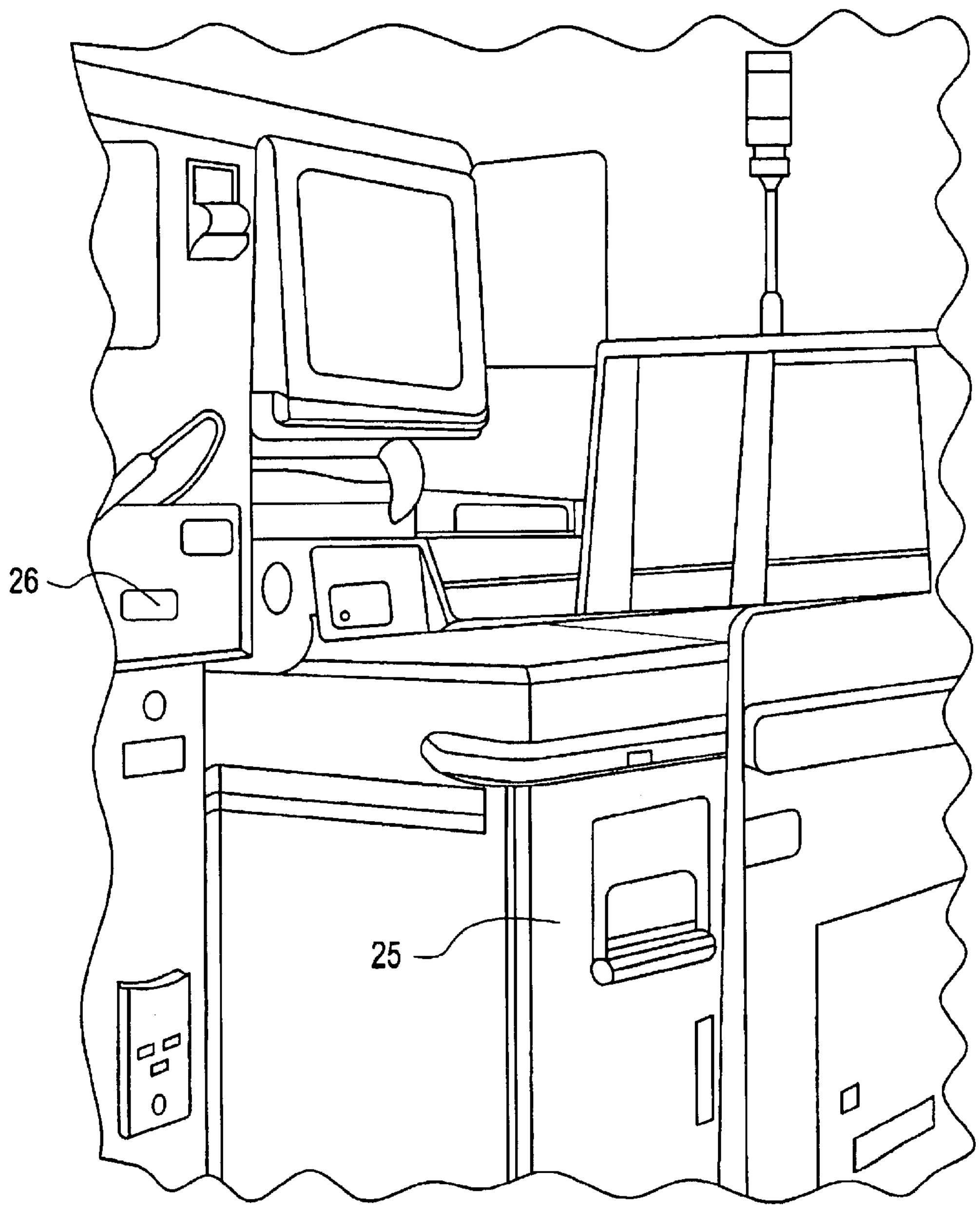
FIG. 15 illustrates coin dispensing and cash dispensing area which dispense change and/or cash back when payment is made using a debit card.

Accordingly, as shown in FIG. 15, if the customer inserts more money than the cost of the transaction, change is dispensed to the customer in the form of coins via coin dispenser 26 and/or paper currency through paper currency dispenser 25.

At the end of the transaction, a receipt/coupons are printed using a receipt printer 16 positioned on top of the security tunnel 15. Coupons may also be printed using a Catalina coupon printer.

Figure 16:
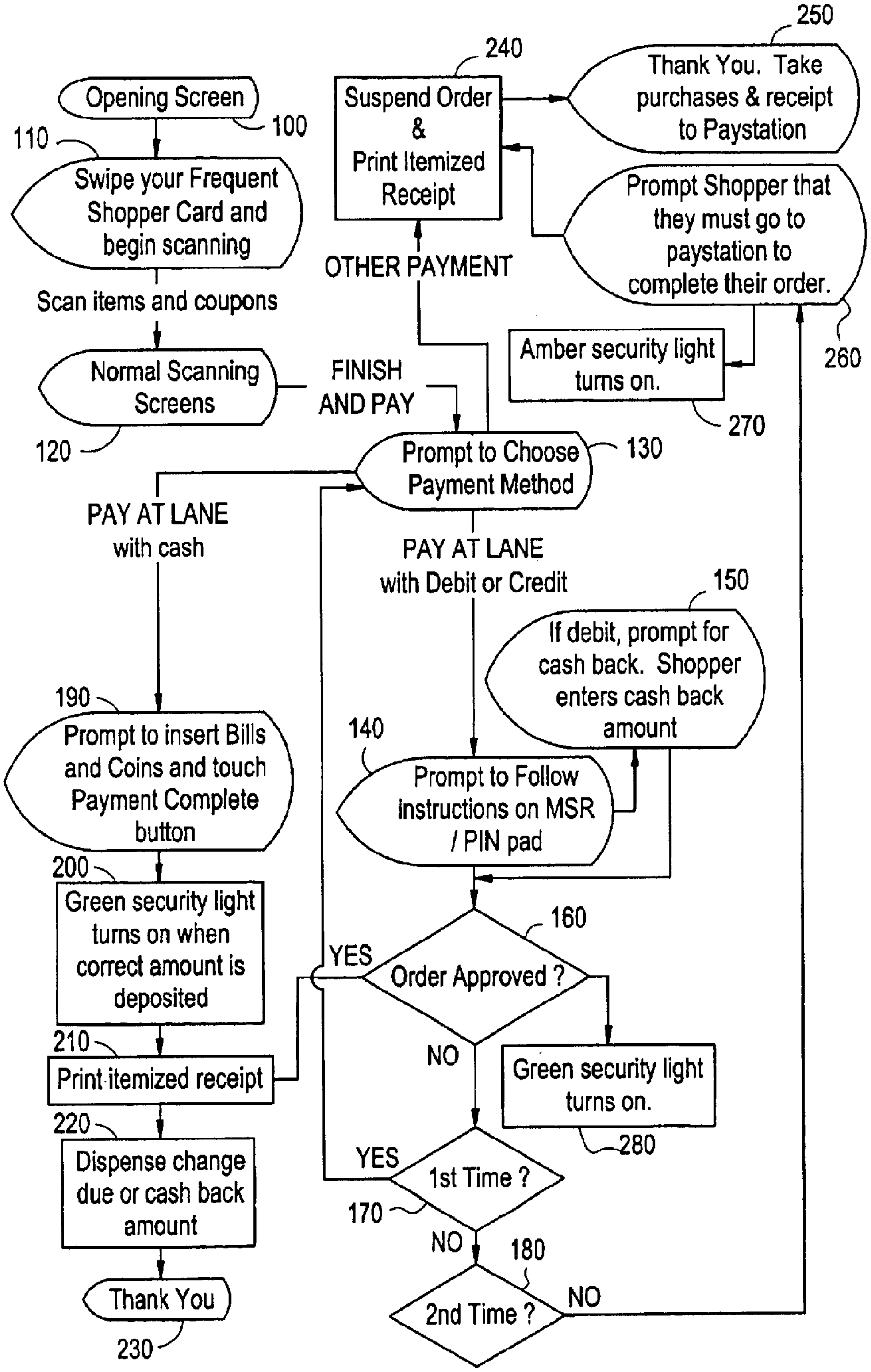
FIG. 16 is a flowchart illustrating the process for self-payment for the self-checkout system according to the present invention.

Accordingly, as shown in FIG. 16, which illustrates a flowchart representing the process according to the cash features of the present invention. Initially, an opening screen is presented to the shopper as the shopper initiates a transaction for the purchase of goods (100). A shopper may scan his frequent shopper card at that point using either the UPC scanner or MSR card reader (110). Thereafter, the customer is prompted to begin scanning items for purchase and any associated coupons (120). At the end of the scanning, the customer selects the "Finish and Pay" icon, at which time, the customer is prompted to choose a payment method (130).

Selection Of DEBIT. If the customer selects to pay for the transaction using a DEBIT card, the customer is prompted to swipe their card and follow the instructions on the PIN pad (140). After following the procedures instructed through the PIN pad and successful completion of their transaction (150, 160), a receipt is printed (210) and the shopper is thanked (230) by the system. If the customer selected through the PIN pad to receive cash back, then amount requested is dispensed (220).

Selection Of CREDIT. If the customer selects the CREDIT icon, he is prompted to swipe the his credit card and follow the instructions on the PIN pad (140). After following the procedures instructed through the PIN pad, and the credit is authorized (160), the shopper is asked to sign the signature tablet and touch the Signature Complete Icon. A receipt is printed (210) and the shopper is thanked (230) by the system.

Selection of Cash. If the shopper selects the Cash icon, then he is prompted to insert bills and coins (190) and then to touch the Payment Complete icon when finished. The shopper then receives any change back that is due (220). The shopper receives a printed receipt (210) and is thanked by the system (230)

Selection of Other Payments. If the shopper would like to use other forms of payments, such as EBT, checks, gift certificates, and the like, then the shopper selects the Other Payments icon and follows the instructions given. The transaction is then suspended to the store's POS, and a verbal prompt instructs the shopper to proceed to the paystation.

The processing of CREDIT and DEBIT cards, cash tendering and change collection areas of the lanes are well labeled to ensure that the payment process is easy for shoppers to follow. Instruction materials are attached to each lane and paystation to provide shopper assistants with a quick reference on system functions and best practices.

All shoppers may receive a full receipt at the lane, with receipts for customers who have paid at the lane preferably including the word "PAID" marked thereon, preferably in large letters, and also including the date and time of the transaction to allow store personnel to quickly identify shoppers who have paid.

In the event of electronic payment using either CREDIT or DEBIT cards, if the payment is not authorized, the shopper is given the opportunity to try again (160, 170, 180) or select another card. If authorization is not given after a configurable amount of attempts (which may be predetermined), the order may automatically be suspended (240, 250, 270) and the shopper is instructed to proceed to a payment station (260) to complete their order.

Figure 17:
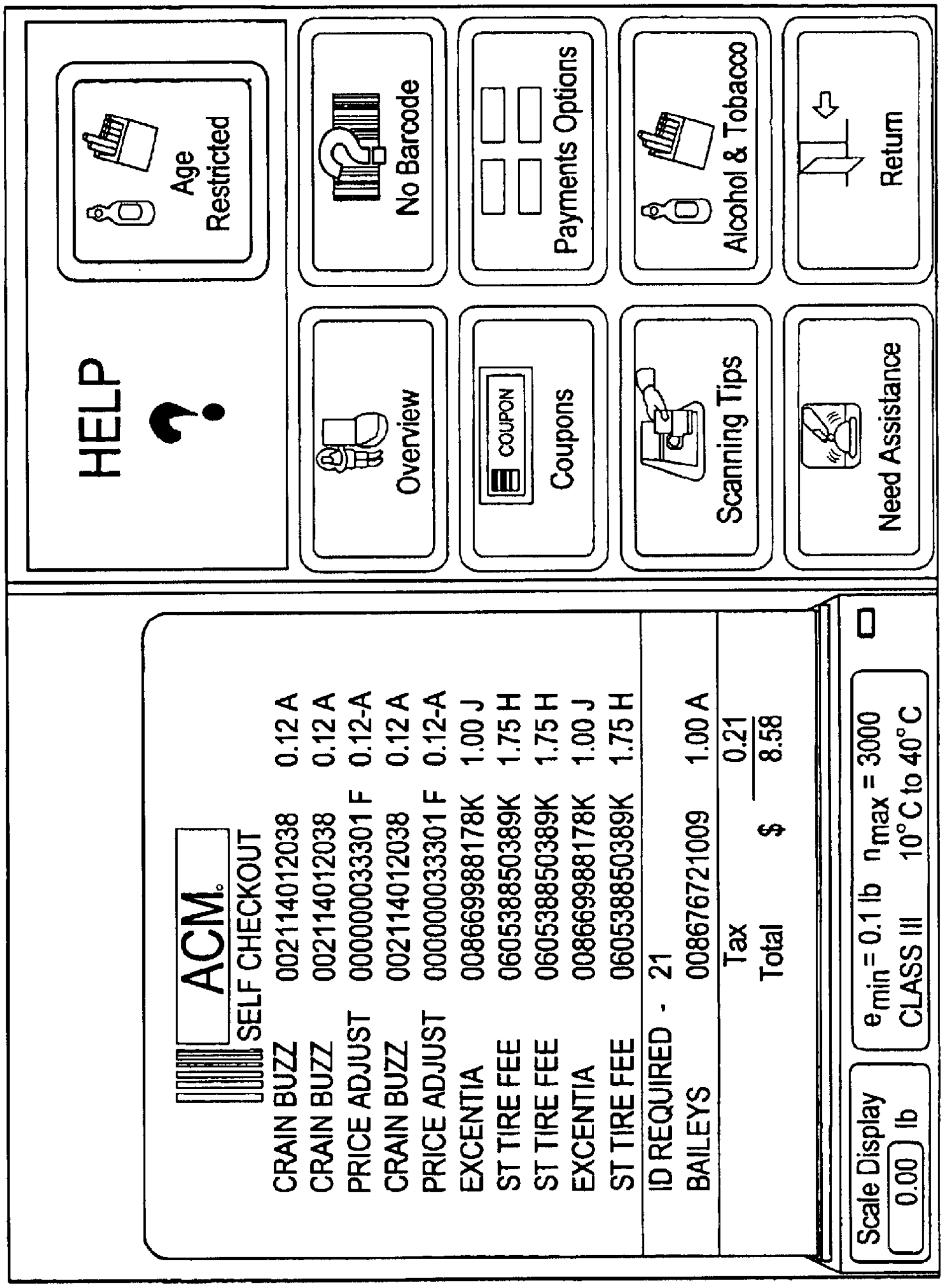
FIG. 17 illustrates a screen shot of a help screen shown on the display to aid a customer in operating/trouble shooting the self-checkout system according to the present invention.

Customers using the self-payment checkout system according to the present invention may inquire for help at any time by selecting a help icon 31 (FIG. 12). When selected, a help screen is displayed (FIG. 17), and displays one or more help icons directed toward a particular area of the system.

Security Tag Deactivator/Detector

Figure 18A:
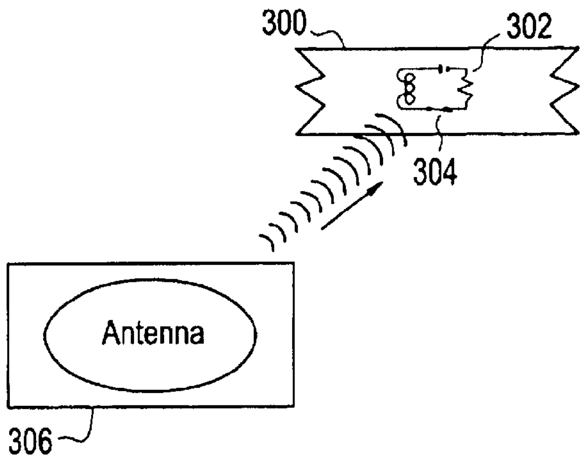
FIGS. 18A–18C illustrate a security tag and security tag deactivation/detector according to the present invention.
Figure 18B:
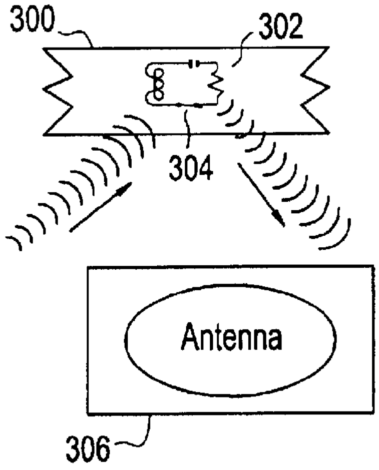
Figure 18C:
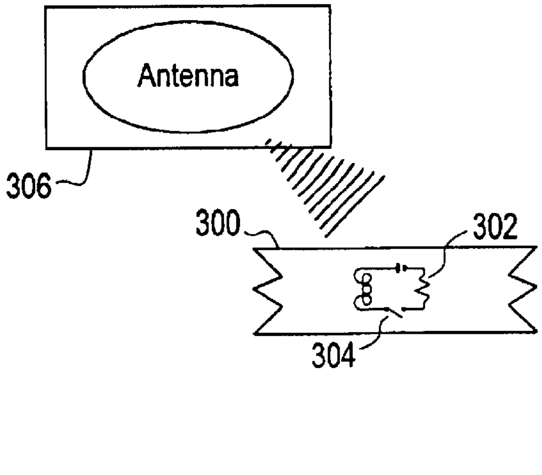

As shown in FIGS. 18A–18C, a security tag 300 includes a tuned circuit 302 sensitive to a particular resonate frequency, and a magnet switch 304. An antenna 306 continuously emits the resonate frequency which is absorbed by the tuned circuit from the security tag. When The security tag receives the resonate frequency and then resonates a signal back towards the antenna. Detection circuitry in the antenna detects the returned signal and in response, generates a magnetic pulse. When the security tag is swiped across a antenna, the magnetic pulse opens the tuned circuit in the tag, deactivating the tag.

Figure 19:
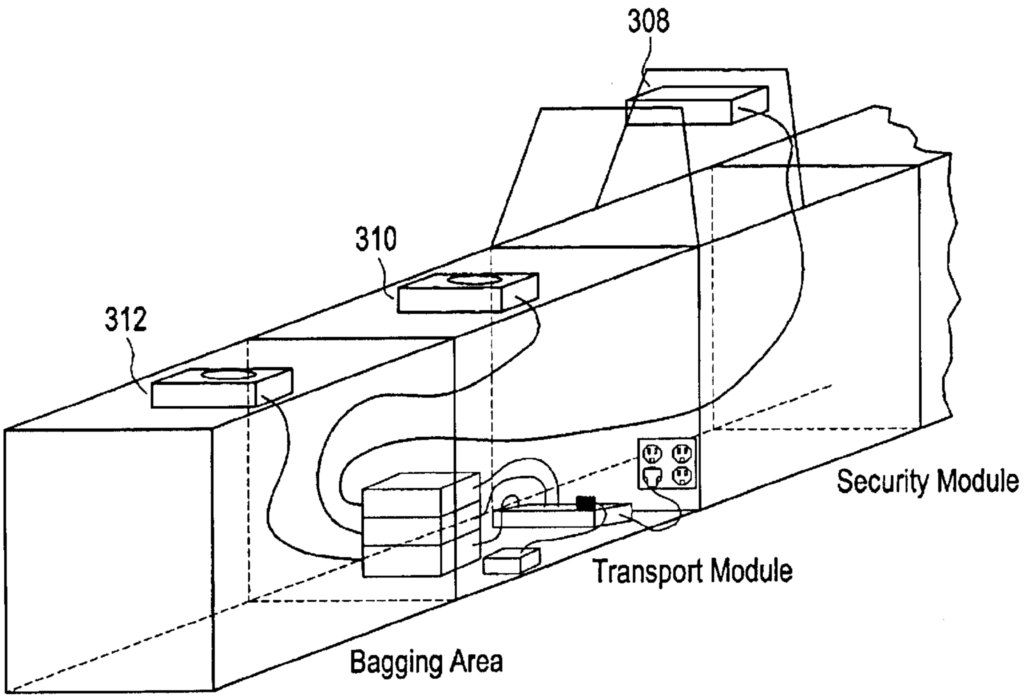
FIG. 19 illustrates the arrangement of security tag deactivators/detectors with the self-checkout apparatus according to the present invention.

As shown in FIG. 19, in a preferred embodiment of the present invention, several deactivator/detector devices with a detector device are utilized. A first security tag detector/deactivator 308 is position in an upper portion of the security arch. A second detector/deactivator 310 is placed below the transport conveyor and a detector 312 only is positioned adjacent the roller cassette near the bagging area at the end of the transport conveyor.

Figure 20:
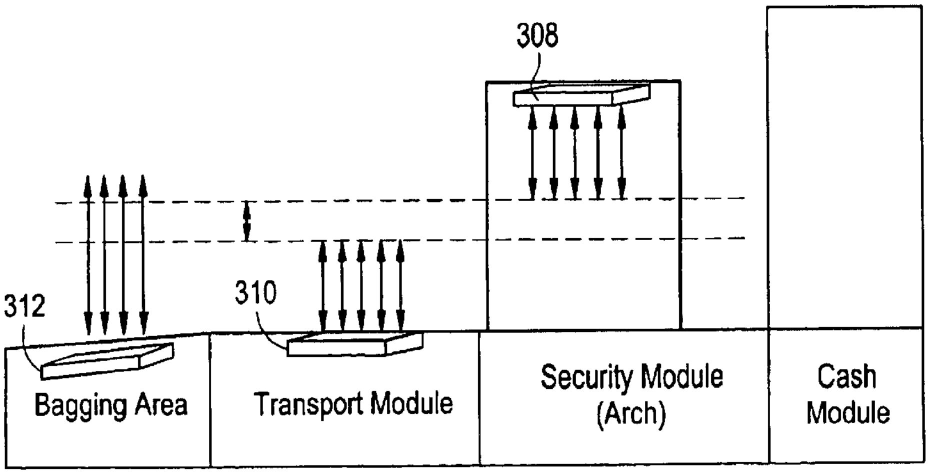
FIG. 20 illustrates the arrangement of security tag deactivators/detectors with the self-checkout apparatus as well as deactivation/detection zones.

As shown in FIG. 20, in a preferred embodiment, the arch and transport deactivator/sensors provide preferably up to a 12" deactivation/detection zone, and more preferably between approximately 4" to 9" field of deactivation, and most preferably between about 5"–7". The fields may overlap or spaced apart a predetermined distance.

Thus, if a tag does not get deactivated by either of the arch or transport conveyor deactivators, the detector positioned in the bagging area will detect such tag and command the system to notify store personnel that such a tag has not been deactivated.

The deactivator/detectors (and stand alone detector) according to the present invention may be controlled by controller 3 (see FIG. 10), in conjunction with CPU 5, to vary the strength of the devices. Accordingly, if an item for purchase is a magnetic sensitive product (e.g., video tape, magnetic computer disk), the strength of the devises may be lessened or turned off when such an item is scanned by the UPC scanner and then placed on the security conveyor. Once the item has been transported out of the security arches, the deactivation/detection devices may be turned up/on, so that subsequently scanned and security tagged items may be properly deactivated.

Alternatively, the deactivation/detection zone for each deactivator/detector may be separately varied. For example, if a video tape is scanned, the deactivator/detector device located under the transport conveyor may be lowered or shut off, while the deactivator/detector device in the arch may remain at the same power level of deactivation/detection.

Thus, having presented the present invention in view of the above described embodiment, various alterations, modifications and improvements are intended to be within the scope and spirit of the invention. The foregoing description is by way of example only and is not intended as limiting. The invention's limit is defined only in the following claims and the equivalents thereto.

While the system of the present invention has been described with reference to the check-out counters of a supermarket, it should be apparent to those skilled in the art that the system can be applied to any distribution system wherein articles bearing individual media that contain identification data are to be maintained under control.

What is claimed is:

1. A security tag deactivation apparatus for a self-checkout system, said self-checkout system comprising product code input means for inputting identification information of a product, a first conveyor for transporting a product whose code has been input into said system, a security zone positioned adjacent said conveyor, said apparatus comprising:

a first zone for detecting and/or deactivating a security tag, said first zone extending from the an upper portion of said security zone down to said conveyor; and a second zone for detecting and/or deactivating a security tag, said second zone extending up from a lower portion of said security zone.

2. The security tag deactivation apparatus according to claim 1, further comprising a third zone for detecting a security tag, said third zone provided adjacent said second zone in a conveyor transporting direction.

3. The security tag deactivation apparatus according to claim 1, wherein a strength of at least one of said first and said second zones may be varied.

4. The security tag deactivation apparatus according to claim 1, wherein said first and said second zones overlap.

5. The security tag deactivation device according to claim 1, wherein a substantial portion of at least one of said first and said second zones lie within the security zone.

6. The security tag deactivation apparatus according to claim 1, wherein said first zone is established by a first deactivator/detector device.

7. The security tag deactivation apparatus according to claim 1, wherein said second zone is established by a second deactivator/detector device.

8. The security tag deactivation apparatus according to claim 2, wherein said third zone is established by a detector device.

9. The security tag deactivation apparatus according to claim 8, wherein a strength of said detector may be varied.

10. A method for deactivating a security tag included on an item comprising:

receiving an item having a security tag attached thereto on a conveyor for transporting said item a predetermined distance, said conveyor transporting said item through a security zone;

providing a first zone for detecting and/or deactivating said tag, said first zone extending down from an upper portion of said security zone to said conveyor; and providing a second zone for detecting and/or deactivating said tag, said second zone extending up from a lower portion of said security zone.

11. The method according to claim 10, said method further comprising providing a security tag detection zone in a downstream conveyor direction from said second zone.

12. The method according to claim 10, said method further comprising varying a strength of at least one of said first and said second zones.

13. The method according to claim 10, said method further comprising overlapping said first and said second zones.

14. The method according to claim 10, said method further comprising varying a strength of said security tag detection zone.

15. A method for deactivating a security tag included on an item comprising:

receiving an article having an active security tag attached thereto on a conveyor;

providing a first deactivation zone established by a first detector/deactivator extending from a first distance down toward said conveyor a second distance; and providing a second deactivation zone established by a second detector/deactivator extending up from said conveyor a third distance, wherein said second distance is positioned above said third distance, a strength of at least one of said first and said second deactivation zones is varied;

providing a security tag detection zone established by a variable strength security tag detector provided adjacent said second deactivation zone; and varying a strength of said security tag detection zone.

16. A method for deactivating a security tag attached to an item in a self-checkout system comprising:

identifying an item having a security tag attached thereto for purchase;

receiving said item on a checkout surface;

providing a first deactivation zone extending from a first distance toward said checkout surface to a second distance; and providing a second deactivation zone extending up from said checkout surface a third distance from said checkout surface.

17. A method for deactivating a security tag included on an item in a self-checkout system comprising:

identifying an item having a security tag attached thereto for purchase;

receiving an article having an active security tag attached thereto on a conveyor;

providing a first deactivation zone established by a first deactivator extending from a first distance down toward said conveyor a second distance; and providing a second deactivation zone established by a second deactivator extending up a third distance above said checkout surface and overlapping said first deactivation zone, wherein said third distance is positioned above said second distance, said third distance is positioned between said surface and said first distance, a strength of at least one of said first and said second deactivation zones may be varied;

providing a security tag detection zone established by a variable strength security tag detector, said detection zone provided adjacent said second deactivation zone in a conveyor transporting direction; and a strength of said security tag detection zone may be varied.

18. A self-checkout system for performing a purchasing transaction comprising:

display means for displaying details associated with a purchasing transaction;

input means for inputting an identification of an article and for inputting an identification of a coupon;

receiving means for receiving said coupon after said coupon identification is input, said receiving means having a sensor for detecting when said coupon has been received;

memory means for storage of a database, said database comprising product identification data, coupon identification data, pricing data associated with said product identification data, credit data associated with said coupon identification data, and association data; and controller means for controlling operation of said system.

19. A self-checkout system for performing a purchasing transaction comprising:

a display for displaying details associated with a purchasing transaction;

a UPC scanner for inputting a first UPC code for an article and for inputting a second UPC code for a coupon;

a coupon compartment for receiving said coupon after said second UPC code is input, said compartment having a sensor for detecting when said coupon has been received;

a memory for storage of a database, said database comprising first UPC code data, second UPC code data, pricing data associated with said first UPC code data, credit data associated with said second UPC code data, and association data comprising information for associating said coupon with said purchasing transaction; and a controller for controlling operation of said system.

20. A method of conducting a purchasing transaction with a customer in a self-checkout apparatus, said method comprising:

receiving an identification of an article for purchase;

displaying a price associated with said first identification on a display;

receiving an identification for a coupon for credit;

validating said coupon, wherein when said coupon is positively validated a credit associated with said coupon is applied against a total of said purchasing transaction, and wherein when said coupon is negatively validated, an error message is displayed indicating that said coupon cannot be used;

receiving said coupon in a coupon receiving area comprising a compartment having an opening with an adjacent sensor for receiving and storing said coupon after said coupon has been positively validated, wherein when said coupon is not received in said coupon receiving area within a predetermined period of time, said credit is withdrawn against said purchasing transaction.

21. A self-checkout system comprising:

input means for receiving input of a product price and/or identification;

a display screen;

a bagging area; and a first zone for detecting and/or deactivating a security tag of an item for purchase.

22. The self-checkout system according, to claim 21, wherein the self-checkout system further comprises a conveyor for transporting items to a bagging area, and wherein the first zone is positioned adjacent the conveyor.

23. The self-checkout system according to claim 22, wherein the self-checkout system further comprises a security zone positioned adjacent the conveyor, and wherein the first zone extends from an upper portion of the security zone downward.

24. The self-checkout system according to claim 23, further comprising a second zone for detecting and/or deactivating a security tag, wherein the second zone extends upward from a lower portion of the security zone.

25. The self-checkout system according to claim 24, further comprising a third zone for detecting and/or deactivating a security tag, wherein the third zone is positioned adjacent the second zone in a conveyor transporting direction.

26. The self-checkout system according to claim 21, wherein a strength of the first zone may be varied.

27. The self-checkout system according to claim 24, wherein the first zone and the second zone overlap.

28. The self-checkout system according to claim 21, wherein said first zone is established by a first deactivator/detector device.

29. The self-checkout system according to claim 24, wherein said second zone is established by a second deactivator/detector device.

30. The self-checkout system according to claim 25, wherein said third zone is established by a detector device.

31. A method for deactivating a security tag included on an item on a self-checkout system, the method comprising:

receiving an item for purchase at a self-checkout system, wherein the item includes a security tag;

directing the item adjacent a first zone, the first zone for detecting and/or deactivating the tag; and detecting and/or deactivating the security tag.

32. The method according to claim 31, further comprising directing the item adjacent a second zone, the second zone for detecting and/or deactivating the tag.

33. The method according to claim 31, further comprising varying a strength of the first zone.

34. The method according to claim 32, further comprising varying a strength of the first zone and/or second zone.

35. The method according to claim 32, wherein the first zone and the second zone overlap.

36. The method according to claim 31, further comprising directing the item adjacent a third zone for detecting a security tag.

37. The method according to claim 32, further comprising directing the item adjacent a third zone for detecting a security tag.

38. The method according to claim 31, wherein the first zone is provided adjacent a conveyor of the self-checkout system.

39. The method according to claim 32, wherein the first zone and the second zone are provided adjacent a conveyor of the self-checkout system.

* * * * *